(12) United States Patent
Lee

(10) Patent No.: US 7,032,697 B2
(45) Date of Patent: Apr. 25, 2006

(54) DRIVE CONTROL SYSTEM FOR VEHICLES WITH AN AUXILIARY DRIVING SYSTEM

(76) Inventor: Hyeongcheol Lee, 2353 Timbercrest Ct., Ann Arbor, MI (US) 48105

( * ) Notice: Subject to any disclaimer, the term of this patent is extended or adjusted under 35 U.S.C. 154(b) by 0 days.

(21) Appl. No.: 10/159,803

(22) Filed: May 30, 2002

(65) Prior Publication Data

US 2003/0221881 A1    Dec. 4, 2003

(51) Int. Cl.
*B60L 11/02*    (2006.01)

(52) U.S. Cl. .................. 180/65.2; 180/65.8; 701/22; 477/4; 477/5

(58) Field of Classification Search ............... 180/65.1, 180/65.2, 65.3, 65.4, 65.6, 65.8, 170; 290/40 C; 701/22; 318/139, 587; 477/2, 3, 4, 5; 322/14, 322/15, 16; 60/698, 706, 709; 188/353
See application file for complete search history.

(56) References Cited

U.S. PATENT DOCUMENTS

| 4,893,691 | A  | * | 1/1990  | Park ........................... 180/169 |
| 5,376,869 | A  | * | 12/1994 | Konrad ....................... 318/587 |
| 6,278,916 | B1 | * | 8/2001  | Crombez ..................... 701/22 |
| 6,321,144 | B1 | * | 11/2001 | Crombez ..................... 701/22 |
| 6,377,007 | B1 | * | 4/2002  | Ozaki et al. ................ 318/432 |
| 6,524,216 | B1 | * | 2/2003  | Suzuki et al. ................. 477/3 |
| 6,527,076 | B1 | * | 3/2003  | Polzin ......................... 180/170 |
| 6,533,081 | B1 | * | 3/2003  | Totsuka et al. ............ 188/110 |
| 6,590,299 | B1 | * | 7/2003  | Kuang et al. ............. 290/40 C |
| 6,595,308 | B1 | * | 7/2003  | Bowen ....................... 180/65.6 |

* cited by examiner

Primary Examiner—Jeffrey J. Restifo

(57) ABSTRACT

A vehicle drive control system comprising a primary driving system having a first power source for providing torque to a first set of one or more wheels and an auxiliary driving system having a second power source for providing torque to a second set of one or more wheels of the vehicle. The auxiliary driving control system is configured to apply torque to a second set of one or more wheels of the vehicle to arrest downhill movement of the vehicle.

13 Claims, 5 Drawing Sheets

DRIVE CONTROL SYSTEM FOR VEHICLES WITH AN AUXILIARY DRIVING SYSTEM

BACKGROUND OF THE INVENTION

The present invention generally relates to a drive control system for a vehicle with an auxiliary driving system. In particular, the present invention relates to a drive control system on a vehicle having an electric motor auxiliary driving system for reducing roll-back when the vehicle is starting motion on a hill or for propelling the vehicle in stop-and-go traffic.

A common problem for an operator of a vehicle that is stopped on an incline or hill is that the vehicle is susceptible to rolling backwards when the operator removes his or her foot from the brake. This problem is especially evident in a vehicle with a manual transmission, although, an operator of a vehicle with an automatic transmission can also experience roll-back to a lesser extent.

Where a manual transmission is employed, the operator of a vehicle starting on a steep slope initially engages both the brake pedal and the clutch pedal and places the vehicle in gear. The operator then moves his or her right foot from the brake pedal to the accelerator pedal and engages the accelerator pedal while releasing the clutch pedal with his or her left foot. If the operator does not perform this operation skillfully and carefully, the operator may experience the unpleasant and undesirable sensation of rolling backwards or even stalling the engine. Additionally, if the accelerator pedal is not applied quickly enough, backward motion can cause the vehicle to roll into another vehicle immediately behind it in traffic.

To address this problem, numerous braking systems, sometimes referred to as "hill-holders," have been developed to arrest backward motion of a vehicle starting on a hill when the operator removes his or her foot from the brake pedal. Prior art "hill-holders" generally disclose clutch or friction brake mechanisms that mechanically restrict vehicle drivelines or the vehicle's wheels to prevent roll-back.

Conventional "hill holder" systems are supplementary mechanisms that increase the cost of the vehicle and complicate manufacture and assembly. Additionally, conventional mechanical mechanisms of this type can cause lurching or uneven acceleration of the vehicle if the brake mechanism of the system disengages improperly after the accelerator pedal has been engaged.

Another common problem experienced by an operator of a vehicle with a manual transmission occurs in stop-and-go traffic such as during rush hour or during city driving. In stop-and-go traffic, the operator must repeatedly engage and release the clutch pedal over a short distance. This repetitive motion can cause strain and discomfort to the operator.

Vehicles with auxiliary driving systems provide a means for reducing roll-back without the need for conventional mechanical "hill holder" systems and can propel a vehicle in stop-and-go traffic without repetitive clutch pedal engagement. Vehicles with auxiliary driving systems generally contain two separate power sources for driving the wheels of the vehicle. A typical configuration for a vehicle with an auxiliary driving system is a vehicle with an internal combustion engine as the power source for a primary driving system and an electric motor as the power source for the auxiliary driving system. The auxiliary driving system can provide on-demand torque delivery to the wheels of the automobile. This provides on-demand four wheel drive capability which promotes stability during slip events. The auxiliary driving system can also be utilized to increase acceleration of the vehicle when desired.

BRIEF SUMMARY OF THE INVENTION

The present invention is a drive control system for controlling advancement of a vehicle having an auxiliary driving system. The drive control system can be used to arrest vehicle roll-back when the vehicle is starting on a steep grade where the vehicle contains a primary driving system for driving one wheel pair and an electric motor powered auxiliary driving system for driving the other wheel pair. The auxiliary driving system is used to apply a driving torque to one set of the vehicle's wheels in order to prevent the vehicle from rolling downhill. The drive control system can also be used to control movement of the vehicle using the auxiliary driving system in stop-and-go traffic without requiring the operator to repetitively engage and release the clutch. The auxiliary driving system propels the vehicle by simple operation of the accelerator pedal.

In accordance with one aspect of the present invention, a vehicle drive control system is provided. The vehicle drive control system comprises a primary driving system having a first power source for providing torque to a first set of one or more wheels and an auxiliary driving system having a second power source for providing torque to a second set of one or more wheels of the vehicle. The auxiliary driving control system is configured to apply torque to a second set of one or more wheels of the vehicle to arrest downhill movement of the vehicle.

In accordance with another aspect of the present invention, a method is provided for preventing movement of a vehicle using an auxiliary driving system. In the first step undesired movement of the vehicle is determined. In the second step, an amount of torque needed to prevent the movement is determined. In a third step, a command is provided to the auxiliary driving system to drive the vehicle in opposition to the movement.

In yet another aspect of the present invention, a method is provided for controlling an auxiliary driving system of a vehicle having a primary driving system and an auxiliary driving system. In the first step, the operator selects operation of the auxiliary driving system. In the second step, the operator engages a clutch pedal. In the third step, the operator selects a gear of a transmission of the primary driving system. In the fourth step, undesired downhill movement of the vehicle is detected. In the fifth step, torque is applied to one or more wheels of the vehicle using the auxiliary driving system to arrest the undesired downhill movement.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
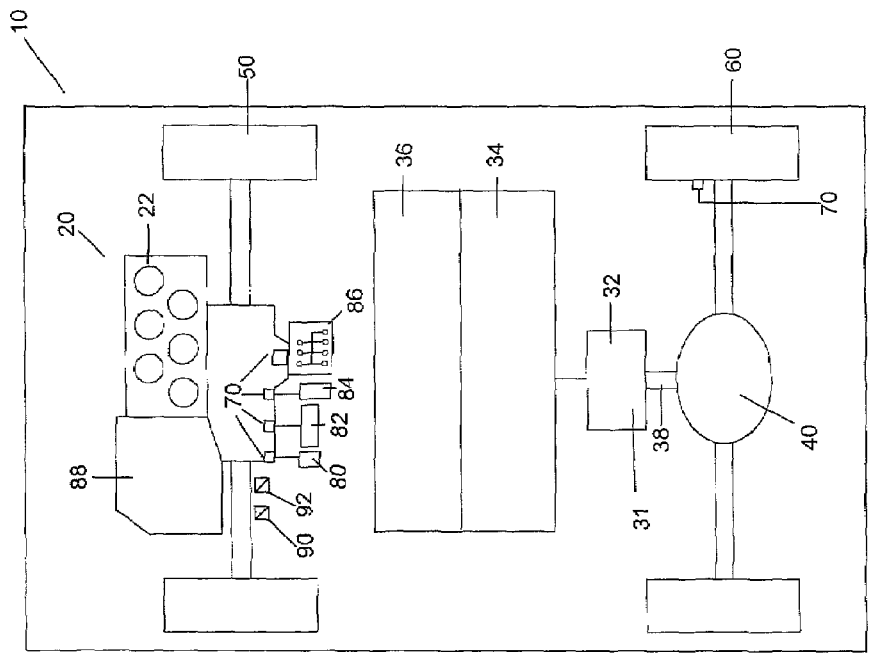
FIG. 1 is a schematic view of a vehicle according to a preferred embodiment of the present invention.

FIG. 1 generally discloses a vehicle 10 having a primary driving system 20 with a first power source 22 and an auxiliary driving system 30 with a second power source 31. In the preferred embodiment, the first power source of the primary driving system 20 is a conventional gasoline internal combustion engine; however, other power sources, such as a compressed natural gas (CNG) powered engine may be used. The second power source of the auxiliary driving system 30 is preferably at least one electric motor 32 that is connected with a battery 34 and is controlled by an electronic control unit 36. The electronic control unit 36 is preferably a computer with a microprocessor and memory for controlling torque application to the auxiliary driving system 30 depending upon desired driving conditions.

In one embodiment of the present invention, depicted in FIG. 1, separate electric motors 32 are used to drive each wheel of a vehicle wheel pair. In another preferred embodiment, shown in FIG. 2, one electric motor 32 is used to provide torque to an axle 38 wherein the drive torque is then distributed to each wheel of a vehicle wheel pair through a differential 40.

Figure 2:
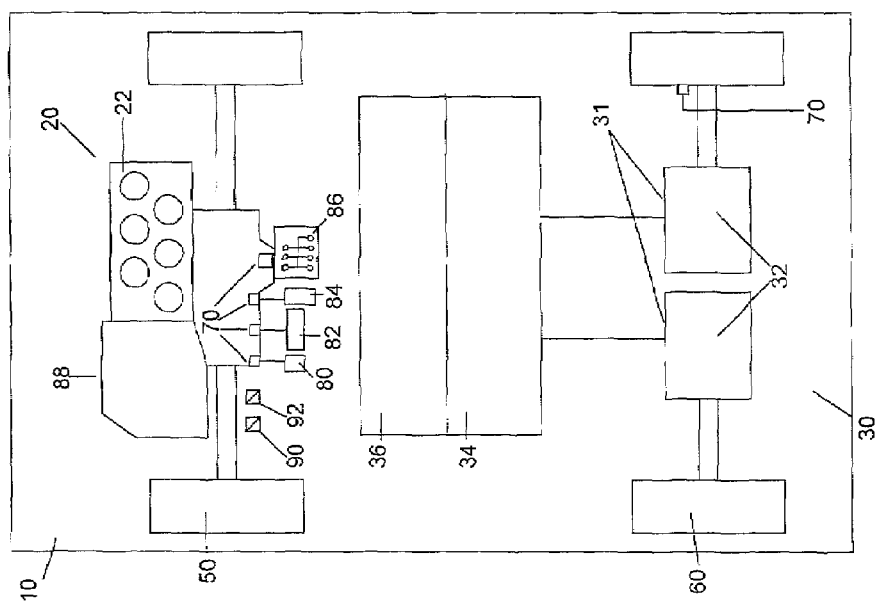
FIG. 2 is a schematic view of a vehicle according to an alternate embodiment of the present invention.

FIGS. 1 and 2 depict a vehicle 10 wherein the primary driving system 20 is a front wheel drive system driving the front wheel pair 50, and the auxiliary driving system 30 is a rear wheel drive system driving the rear wheel pair 60. One skilled in the art will recognize that in another preferred embodiment (not shown), the primary driving system 20 may drive the rear wheel pair 60 and the auxiliary driving system 30 may drive the front wheel pair 50. One skilled in the art will also recognize that the vehicle 10 may, in some situations, primarily be driven by the electric motor 32. Additionally, one skilled in the art will recognize that the present system may also be utilized in hybrid electric vehicles (HEV's).

Sensors 70 on the vehicle 10 are used to measure a plurality of driving conditions. Preferably, wheel angular speed sensors 70 are used to monitor wheel speed and direction. Additionally, sensors 70 may be used to monitor whether the operator has engaged the clutch pedal 80, brake pedal 82 or accelerator pedal 84 and the gear 86 in which the transmission 88 is engaged. All sensors preferably communicate with the electronic control unit 36 such that the control unit's memory stores information received from the sensors 70 and the control unit's microprocessor interprets and manages the information received from the sensors 70.

As will be set forth in detail below, the auxiliary driving system 30 can be used to prevent "roll-back" of a vehicle when "Starting On Hill Mode" (SHM) is activated. When "Starting On Hill Mode" is activated, the electronic control unit 36 instructs the electric motor 32 to provide drive torque to the rear wheels 60 of the vehicle 10 so that the vehicle does not roll downhill.

During operation, the primary driving system 20 is preferably used as the primary source to drive the vehicle 10. The auxiliary driving system 30, while capable of driving the vehicle 10 when desired, is not used to provide constant driving torque to the wheels 60 of the vehicle 10. When an operator is starting the vehicle 10 in first gear on a hill or incline, the vehicle 10 may be susceptible to rolling backwards or downhill as the operator removes his or her foot from the brake pedal 82 and before the operator has engaged the accelerator pedal 84. Wheel angular speed sensors 70 monitor wheel rotation of the rear wheels 60 to determine if the vehicle is undesirably rolling backward. Sensors also monitor whether the operator has engaged the clutch pedal 80, the brake pedal 82 or the accelerator pedal 84. Information from the sensors 70 is communicated to the electronic control unit 36. Where "Starting On Hill Mode" has been activated, the electronic control unit 36 commands the auxiliary driving system 30 to temporarily provide forward driving torque at the rear wheels 60 in order to effectively brake the backward rolling of the vehicle until the operator has engaged the accelerator pedal of the vehicle 10. Once the operator engages the accelerator pedal 84 the primary driving system 20 then drives the vehicle 10 as in conventional operation. When the vehicle 10 is driven forward by the primary driving system 20, the electronic control unit 36 of the auxiliary driving system 30 deactivates "Starting On Hill Mode." The electric motor 32 and any torque that it provides may then be deactivated.

Although the above describes a vehicle that is starting on an incline, one skilled in the art will recognize that the auxiliary driving system can be used for preventing a vehicle from rolling forward if the vehicle is on a decline and the operator has placed the vehicle in reverse gear. In that situation, wheel angular speed sensors 70 monitor wheel rotation of the rear wheels 60 to determine if the vehicle is undesirably rolling forward. Where "Starting On Hill Mode" has been activated, the electronic control unit 36 directs the electric motor 32 of the auxiliary driving system 30 to temporarily provide rearward driving torque at the rear wheels 60 in order to effectively brake the forward rolling of the vehicle until the operator has engaged the accelerator pedal 84 of the vehicle 10. Once the operator engages the accelerator pedal, the primary driving system 20 then drives the vehicle 10 in conventional operation. When the vehicle 10 is driven rearward by the primary driving system 20, the electronic control unit 36 of the auxiliary driving system 30 deactivates "Starting On Hill Mode" and deactivates the electric motor 32.

Figure 3:
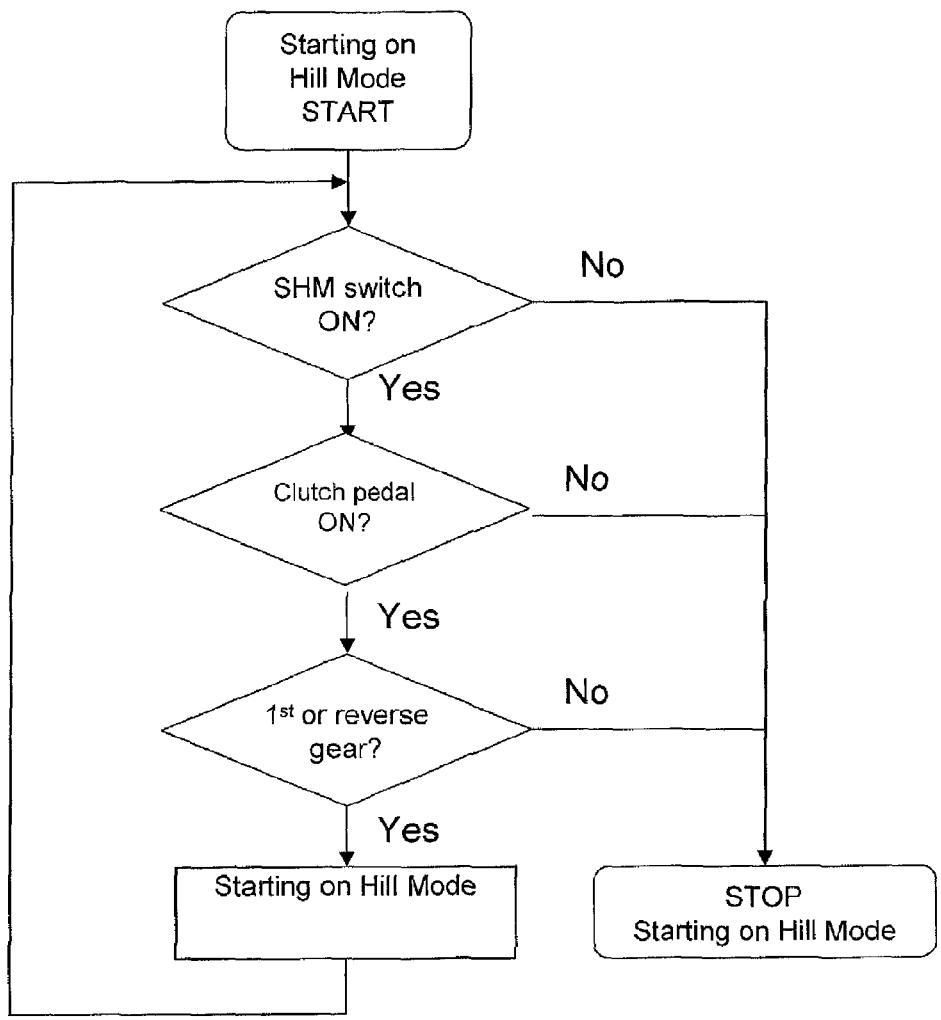
FIG. 3 is a logic flow chart representing a preferred embodiment of the present invention.

FIG. 3 is a flow diagram that illustrates the conditions under which "Starting On Hill Mode" will be activated. With regard to the events in FIG. 3, a sensor monitors whether a Starting On Hill Mode (SHM) switch 90 is On or Off. The switch 90 is controllable by the vehicle operator and is preferably located on the vehicle's instrument panel. Another sensor 70 monitors whether the clutch pedal 80 is engaged by the operator. Preferably, the clutch pedal 80 is engaged when the operator pushes down on clutch pedal 80 with his or her foot. When the clutch pedal 80 is engaged, it is considered to be "On." Finally, sensors 70 also monitor in which gear 86 the operator has placed the transmission 88. The transmission preferably has a reverse gear and at least one forward gear. The first forward gear is typically called "$1^{st}$ gear."

"Starting On Hill Mode" will be ON if
(i) the SHM switch 90 (or button) at the vehicle instrument panel is turned on AND,
(ii) the clutch pedal 80 is engaged AND,
(iii) the gear shift 86 of the vehicle is placed in 1$^{st}$ gear or reverse gear. If these conditions are present, "Starting On Hill Mode" will be activated.

Conversely, "Starting On Hill Mode" will be deactivated if
(i) the SHM switch 90 (or button) is off OR
(ii) the clutch pedal 80 is not engaged OR,
(iii) the gear shift 86 of the vehicle is not in 1$^{st}$ gear or reverse gear.

Figure 5:
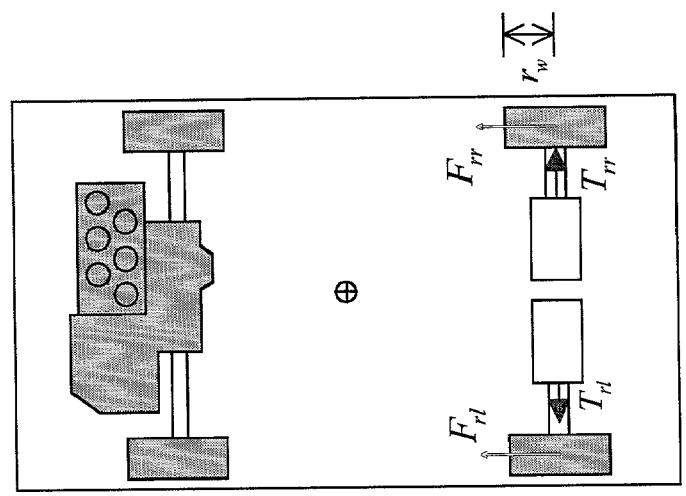
FIG. 5 is a schematic diagram illustrating forces within the auxiliary driving system, including torque forces on the rear left and rear right wheels, according to one embodiment of the present invention.
Figure 4:
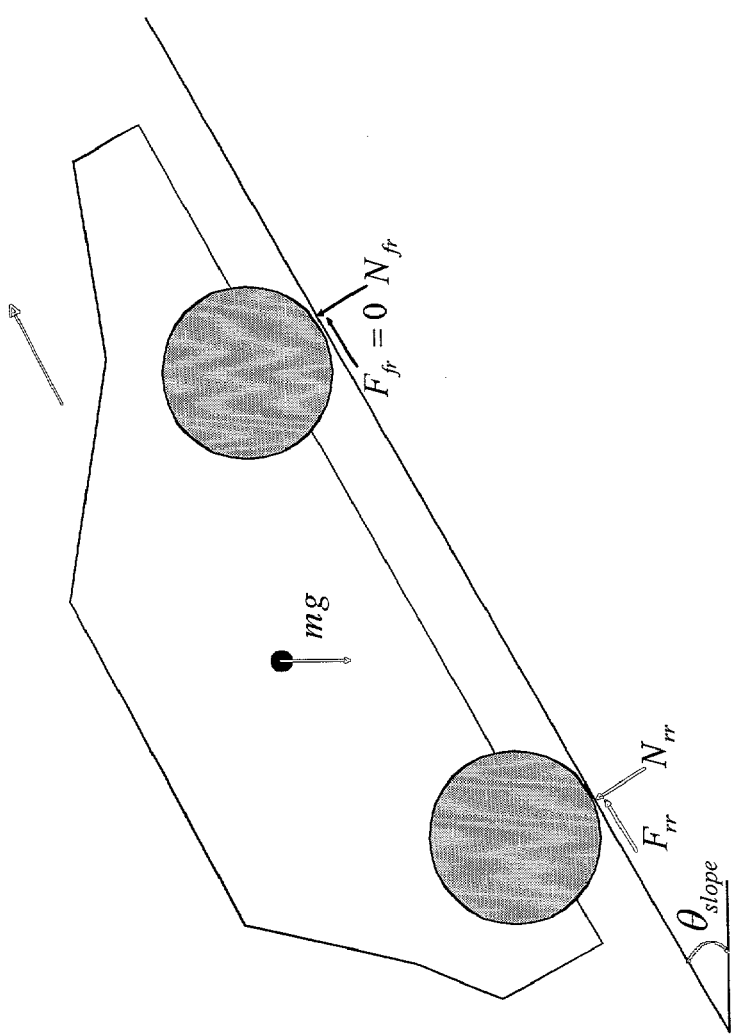
FIG. 4 is a force diagram of a vehicle on an incline.

When the "Starting On Hill Mode" is activated and the vehicle is rolling downhill undesirably, the auxiliary driving system preferably provides enough driving torque to stop the vehicle from rolling in order to maintain a static position. FIGS. 4 and 5 illustrate the forces experienced by the vehicle components during operation of the present invention. During operation of the preferred embodiment, applied torque to the front wheels 50 is zero because the brake pedal is released and the operator has not yet engaged the accelerator pedal. Therefore, where $F_{vehicle}$ is the traction force of the vehicle, m is the mass of the vehicle, $a_x$ is the acceleration of the vehicle, $F_{rl}$ is the traction force of the rear left wheel, $F_{rr}$ is the traction force of the rear front wheel, g is the gravitational acceleration, θ is the angle of the slope, and $F_{drag}$ is the drag force on the vehicle, the overall effective traction force of the vehicle is defined by:

$$F_{vehicle} = ma_x = F_{rl} + F_{rr} - mg \sin \theta - F_{drag}$$

With respect to each wheel, where $r_w$ is the radius of the rear wheels, $T_{rl}$ is the torque on the rear left wheel, $T_{rr}$ is the torque on the rear right wheel, $I_w$ is the mass moment of inertia for the rear wheels, $\dot{\omega}_{rl}$ is the angular acceleration of the rear left wheel, and $\dot{\omega}_{rr}$ is the angular acceleration for the rear right wheel, then:

$$F_{rl} r_w = T_{rl} - I_w \dot{\omega}_{rl}$$

$$F_{rr} r_w = T_{rr} - I_w \dot{\omega}_{rr}$$

If both rear wheels 60 are on the same surface and the wheels experience no slipping during operation and $F_{drag}$ is zero, then the required torque for the electric motor 32 to prevent the car from rolling backwards is represented by:

$$T_r = T_{rl} = T_{rr} = \frac{r_w mg \sin \theta}{2}$$

Unlike a conventional mechanical braking system which may be able to hold a vehicle on a steep grade without roll-back, the auxiliary driving system may not eliminate vehicle-roll back where the angle of the incline is great enough to cause a "roll-back" force that is greater than the available driving torque that the electric motor is able to produce at zero or low speed. For example, if the maximum torque of the auxiliary driving actuator at zero or low speed is 300 Nm and the vehicle parameters are such that m=1400 kg and $r_w$=0.31 m, the critical slope angle which can be supported by the auxiliary driving system 30 is:

$$\theta_{critical} \approx 8.1 \text{ deg}$$

Figure 6:
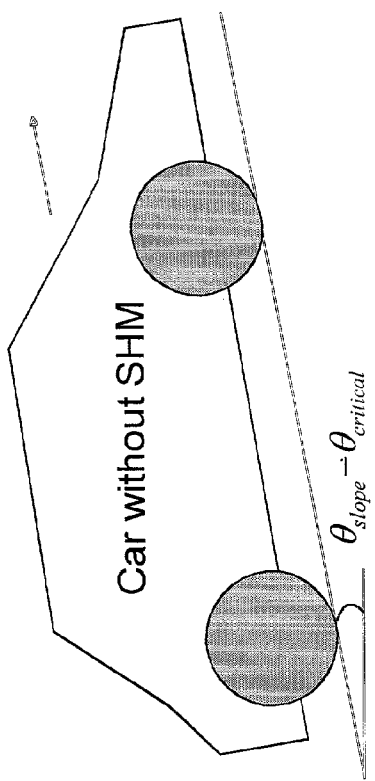
FIG. 6 is a diagram illustrating realized forces on a vehicle using a preferred embodiment of the present invention.
Figure 6:
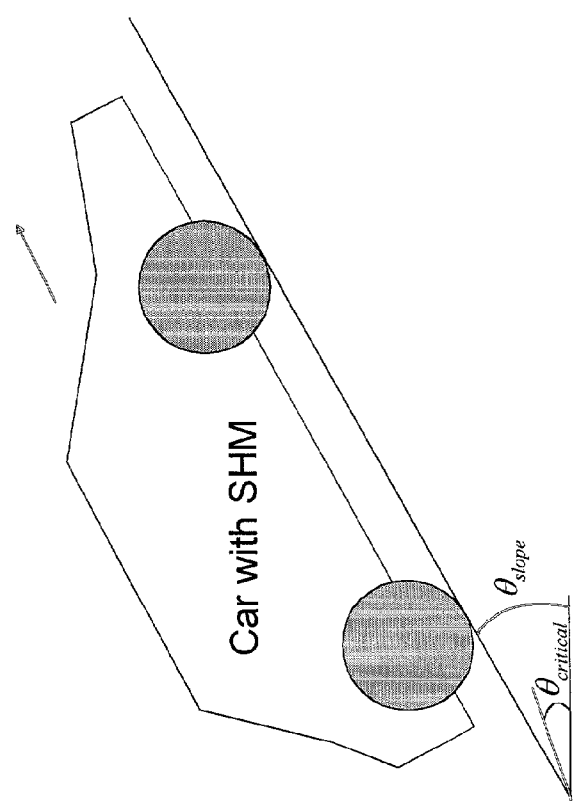

If the slope angle $\theta_{slope}$ is the same as or smaller than the critical slope, the auxiliary driving system will be able to prevent the vehicle from rolling backwards. If, however, the slope angle $\theta_{slope}$ is greater than the critical slope, the vehicle will roll back. Although roll back will be experienced, the auxiliary driving system will reduce the rate of roll back which will, in turn, minimize negative sensations from rolling backwards. The difference experienced in roll back sensation to the operator between a vehicle on a steep grade with and without "Starting On Hill Mode" activated is illustrated in FIG. 6. As can be seen in FIG. 6, although an operator may experience roll back, it will feel less severe and as though the operator is on a smaller grade slope.

If the vehicle has an accelerator pedal sensor 70, a brake pedal sensor 70 and a longitudinal accelerometer (not shown), the SHM switch or button may be replaced by a "Starting On Hill" detection algorithm. For example, if the angular displacement value of the longitudinal accelerometer is greater than a predetermined value (indicating the vehicle on an incline), and the clutch pedal is engaged and the accelerator pedal is not engaged, "Starting On Hill Mode" will be activated. If the clutch pedal is not engaged or the vehicle is not in first or reverse gear, then "Starting On Hill Mode" will not be activated.

The drive control system can also be used to propel the vehicle using the auxiliary driving system in stop-and-go traffic conditions. This is referred to as "Stop-and-Go Mode." This mode will allow the vehicle to be driven at low to medium speeds without requiring the operator to repeatedly engage and release the clutch pedal or operate the gear shift.

Figure 7:
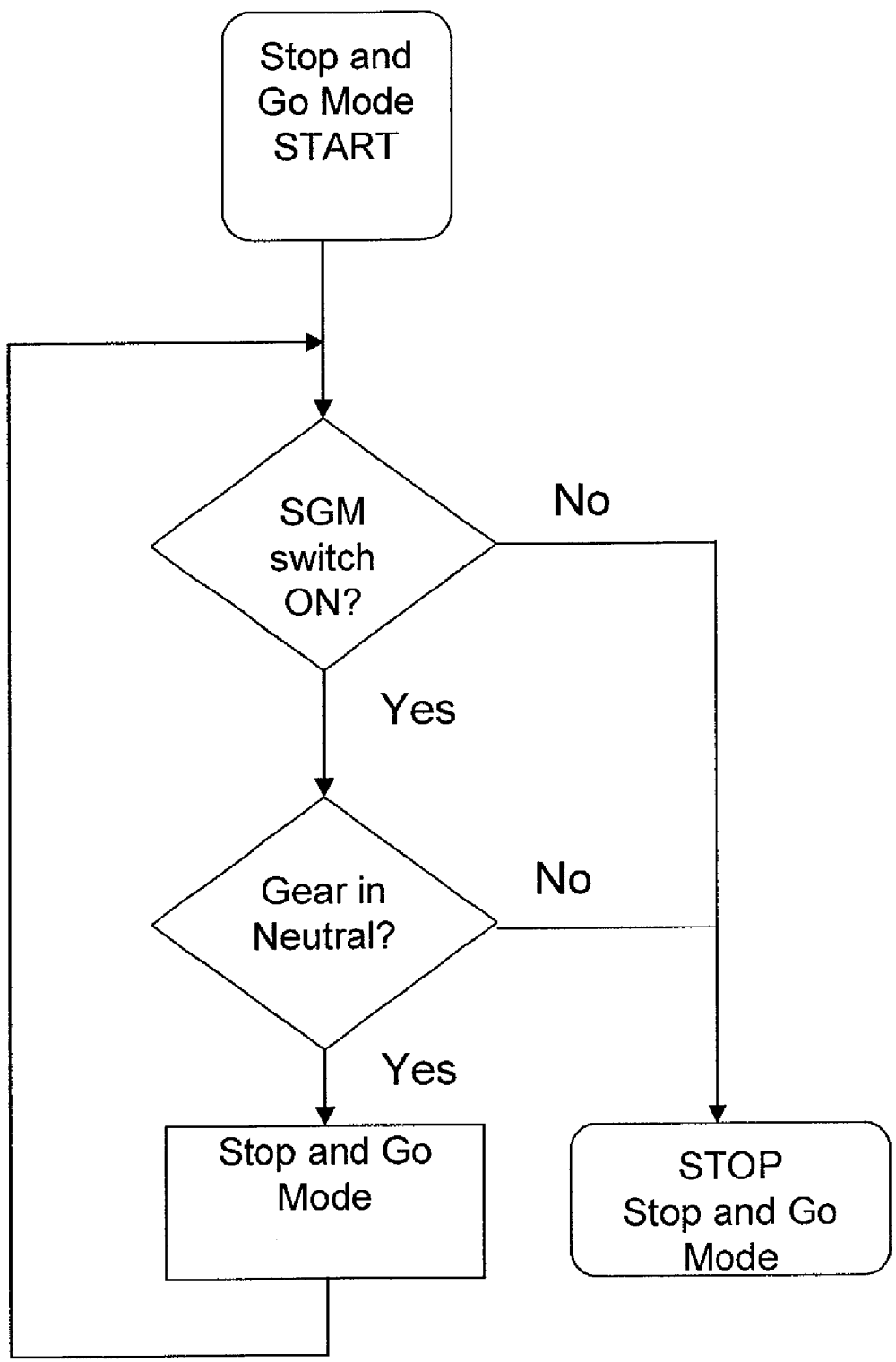
FIG. 7 is a logic flow diagram representing a preferred embodiment of the present invention.

FIG. 7 is a flow diagram that illustrates the conditions under which "Stop-and-Go Mode" will be activated. With regard to the events in FIG. 7, a sensor monitors whether the "Stop-and-Go Mode" (SGM) switch 92 is On or Off. The switch 92 is controllable by the driver and is preferably located on the vehicle's instrument panel. Sensors 70 also monitor whether the operator has placed the transmission 88 in neutral.

In this mode, the transmission 86 of the primary driving system 20 is placed in neutral. The power source 22 of the primary driving system 20 does not provide the driving torque to propel the vehicle 10. Instead, the power source 22 may be used to run an alternator that charges the battery 34 of the auxiliary driving system. The electric motors 32 are then used to provide drive torque to the wheels 60 of the vehicle 10 without requiring the operator to engage and release the clutch pedal 80 or put the primary driving system transmission 88 in gear. The amount of drive torque provided to the wheels 60 of the auxiliary driving system is controlled by the operator by engaging the accelerator pedal 84.

"Stop-and-Go Mode" will be ON if
i) the SGM switch 92 (or button) at the vehicle instrument panel is turned on AND,
(ii) the transmission 88 of the primary driving system is placed in neutral.

While this mode is activated, the vehicle operator only need operate the accelerator pedal 84 to move the car forward in stop-and-go traffic. Sensors 70 preferably monitor the angle of the accelerator pedal 84. The speed that the auxiliary driving system 30 drives the vehicle is dependant on how far the accelerator pedal 84 is pushed by the operator.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A vehicle drive control system comprising:
a primary driving system having a first power source for providing torque to a first set of one or more wheels of a vehicle;
an auxiliary driving system having a second power source for providing torque to a second set of one or more wheels of the vehicle wherein the auxiliary driving system is configured to apply torque to the second set of one or more wheels of the vehicle to arrest downhill movement of the vehicle wherein torque is delivered to the first set of one or more wheels from the first power source via a manual transmission having at least a first gear and a reverse gear; and
an operator controllable switch operable to control activation of the auxiliary driving system wherein when the operator controllable switch is turned on and the transmission of the primary driving system is in neutral gear the operator can direct the auxiliary driving system to provide drive torque to the second set of one or more wheels of the vehicle to propel the vehicle.

2. The vehicle drive control system of claim 1 wherein the auxiliary driving system is configured to provide torque to the second set of one or more wheels of a vehicle to arrest downhill movement of the vehicle when the primary driving system is providing zero torque to the first set of one or more wheels of the vehicle.

3. The vehicle control system of claim 1 wherein the auxiliary driving system provides a forward drive torque when the transmission is in first gear and wherein the auxiliary driving system provides a backward driving torque when the transmission is in reverse gear.

4. The vehicle drive control system of claim 1 wherein the amount of drive torque provided to the second set of one or more wheels of the vehicle is determined by how far an accelerator pedal is pushed by the operator.

5. The vehicle control system of claim 4 wherein the auxiliary control system stops providing drive torque to the second set of one or more wheels of the vehicle when the transmission of the primary driving system is placed in first gear.

6. The vehicle drive control system of claim 1 further comprising a clutch pedal and a transmission having at least one gear wherein the auxiliary driving system arrests downhill movement of the vehicle when the clutch pedal is engaged and the at least one gear is selected.

7. A method of preventing downhill movement of a vehicle using an auxiliary driving system, said method including the steps of:
providing a vehicle comprising a primary driving system with a first power source for providing power to a first set of wheels and an auxiliary driving system with a second power source for providing power to a second set of wheels;
using the primary driving system as the primary source to drive said vehicle;
determining undesired downhill movement of said vehicle;
determining an amount of torque needed to oppose said movement;
providing a command in accordance with said amount of torque to said auxiliary driving system to arrest the undesired downhill movement; and
selecting operation of the auxiliary driving system to provide drive torque to arrest the undesired movement.

8. The method of claim 7 wherein the first power source is an internal combustion engine and the second power source is an electric motor.

9. The method of claim 7 wherein determining undesired movement is measuring wheel movement using at least one sensor.

10. The method of claim 7 wherein selecting operation of the auxiliary driving system to provide drive torque to arrest the undesired movement comprises measuring angular displacement of the vehicle from longitudinal accelerometer, measuring engagement of a brake pedal and measuring engagement of an accelerator pedal.

11. The method of claim 7 wherein selecting operation of the auxiliary driving system to provide drive torque to arrest the undesired movement comprises measuring the position of an operator controllable switch, measuring engagement of the clutch pedal, and measuring the gear in which a transmission has been placed.

12. A method for controlling an auxiliary driving system of a vehicle having a primary driving system and an auxiliary driving system, said method including the steps of:
selecting operation of the auxiliary driving system by the operator;
engaging a clutch pedal of the vehicle by the operator;
selecting a gear of a transmission of the primary driving system by the operator;
detecting undesired downhill movement of the vehicle;
applying torque to one or more wheels of the vehicle using the auxiliary driving system to arrest the undesired downhill movement.

13. A method of preventing movement of a vehicle using an auxiliary driving system, said method including the steps of:
providing a vehicle comprising a primary driving system with a first power source for providing power to a first set of wheels and an auxiliary driving system with a second power source for providing power to a second set of wheels;
using the primary driving system as the primary source to drive said vehicle;
selecting operation of the auxiliary driving system to provide drive torque to arrest undesired movement by measuring the position of an operator controllable switch, measuring engagement of a clutch pedal, and measuring a gear in which a transmission has been placed;
determining undesired movement of said vehicle;
determining an amount of torque needed to oppose said movement;
providing a command in accordance with said amount of torque to said auxiliary driving system to arrest the undesired movement.

* * * * *